(12) United States Patent
Kanamori et al.

(10) Patent No.: US 7,489,951 B2
(45) Date of Patent: Feb. 10, 2009

(54) PORTABLE TELEPHONE SET

(75) Inventors: Miwa Kanamori, Ogaki (JP); Yuichi Kanai, Bisai (JP); Seiya Ota, Aichi (JP); Toshiaki Hioki, Ogaki (JP); Yoshihiro Hori, Gifu (JP); Megumi Makino, Gifu (JP); Masaya Okumura, Gifu (JP); Jiro Yokoyama, Osaka (JP); Tohru Kawabata, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 420 days.

(21) Appl. No.: 10/720,107

(22) Filed: Nov. 25, 2003

(65) Prior Publication Data

US 2004/0106432 A1    Jun. 3, 2004

Related U.S. Application Data

(62) Division of application No. 09/551,219, filed on Apr. 17, 2000, now Pat. No. 6,662,022.

(30) Foreign Application Priority Data

| Apr. 19, 1999 | (JP) | ................................. 11-111032 |
| Sep. 14, 1999 | (JP) | ................................. 11-260434 |
| Mar. 21, 2000 | (JP) | ................................. 2000-78971 |
| Mar. 23, 2000 | (JP) | ................................. 2000-81522 |

(51) Int. Cl.
*H04B 1/38* (2006.01)
(52) U.S. Cl. ...................... 455/567; 455/344; 455/556.1
(58) Field of Classification Search .............. 455/414.1, 455/415, 416, 556.1, 567, 569.1, 575.1, 344
See application file for complete search history.

(56) References Cited

U.S. PATENT DOCUMENTS

| 5,404,391 A | 4/1995 | Wavroch et al. |
| 5,661,788 A | 8/1997 | Chin |
| 5,758,280 A | 5/1998 | Kimura |
| 5,845,219 A | 12/1998 | Henriksson |
| 6,006,115 A | 12/1999 | Wingate |
| 6,040,782 A | 3/2000 | Banno |

FOREIGN PATENT DOCUMENTS

FR    2 756 999    12/1998

(Continued)

OTHER PUBLICATIONS

"Phone Mail Override for Incoming Calls", IBM® Technical Disclosure Bulletin, vol. 37, No. 11, Nov. 1994, pp. 543-544.

(Continued)

*Primary Examiner*—Quochien B Vuong
(74) *Attorney, Agent, or Firm*—McDermott Will & Emery LLP

(57) ABSTRACT

A portable telephone set capable of recognizing a call during music replay is disclosed. This portable telephone set comprises talking means and music replay means, and posts a call when receiving the same during music replay by the music replay means. Thus, the call can be recognized during the music replay.

5 Claims, 5 Drawing Sheets

FOREIGN PATENT DOCUMENTS

| | | | |
|---|---|---|---|
| GB | 2 308 775 | | 7/1997 |
| JP | 63184447 | | 7/1988 |
| JP | 01143511 | | 6/1989 |
| JP | 04-243358 | | 8/1992 |
| JP | 4-243358 | | 8/1992 |
| JP | 06-097876 | | 4/1994 |
| JP | 06-334729 | * | 12/1994 |
| JP | 07-336413 | | 12/1995 |
| JP | 09-036952 | | 2/1997 |
| JP | 10-042036 | | 2/1998 |
| JP | 10-126291 | | 5/1998 |
| JP | 10-190789 | | 7/1998 |
| JP | 10-308980 | | 11/1998 |
| JP | 11-055751 | | 2/1999 |
| JP | 2001-245024 | | 9/2001 |
| WO | WO 99/00962 | * | 1/1999 |
| WO | WO 99/43136 | | 8/1999 |

OTHER PUBLICATIONS

Japanese Office Action, with English translation, issued in Japanese Patent Application No. JP 2006-032519, mailed Jul. 17, 2007.

"PHS Telephone Set, Product No. PHS-J80, Instruction Manual", Sanyo Electric Co. Ltd., Version 9908, Aug. 1999, pp. 5-22-5-23.

* cited by examiner

PORTABLE TELEPHONE SET

This application is a divisional of application Ser. No. 09/551,219 filed Apr. 17, 2000, now U.S. Pat. No. 6,662,022.

BACKGROUND OF THE INVENTION

1. Field of the Invention

The present invention relates to a portable telephone set, and more specifically, it relates to a portable telephone set having talking means and music replay means.

2. Description of the Prior Art

In general, a portable telephone set has a plurality of functions in addition to a communicative function. For example, a well-known portable telephone set has a function of reproducing/outputting information (including voices and music) and a function of displaying information (texts and images) in addition to a communicative function.

However, the conventional portable telephone set executes only one of the functions at a time. When a call is received during reproduction/output of information, therefore, the portable telephone set is regarded as busy, to consequently reject the call. In this case, the portable telephone set continuously reproducing/outputting the information cannot answer even to an important call. When talking over the telephone, on the other hand, the user of the portable telephone set cannot listen to music replayed by the same but may be discontented.

SUMMARY OF THE INVENTION

An object of the present invention is to provide a portable telephone set capable of recognizing a call while replaying music.

Another object of the present invention is to provide a portable telephone set capable of ensuring a communicative function, which is the basic function, without stopping music replay.

A portable telephone set according to a first aspect of the present invention comprises talking means and music replay means. When receiving a call during music replay by the music replay means, the portable telephone set posts this call. Thus, the call can be recognized during the music replay due to the aforementioned structure.

When receiving the call during the music replay by the music replay means, the portable telephone set according to the first aspect preferably superposes a tone posting the call on replayed music in the process of the music replay by the music replay means. Thus, the call can be readily recognized during the music replay due to the aforementioned structure.

The portable telephone set according to the first aspect preferably further comprises telephone number storage means storing telephone numbers, for superposing the tone posting the call on the replayed music in the process of the music replay by the music replay means when receiving the call from any of the telephone numbers stored in the telephone number storage means during the music replay. Due to this structure, the portable telephone set posts the call only when receiving the same from any of the stored telephone numbers during music replay. Thus, the user of the portable telephone set can be prevented from an unpleasant disturbance of the music replay caused by an erroneous or nuisance telephone call from a third party.

In this case, further, the portable telephone set preferably performs no call processing when receiving the call from a telephone whose number is not stored in the telephone number storage means during the music replay by the music replay means. Thus, the user can keep on listening to the music with no disturbance by a call from a person not in need of talking.

Further, the portable telephone set according to the first aspect preferably further comprises telephone number storage means storing telephone numbers and call set means selecting/setting a telephone number authorized to call among the telephone numbers registered in the telephone number storage means, for superposing the tone posting the call on the replayed music in the process of the music replay by the music replay means when receiving the call from the telephone number authorized by the call set means to call during the music replay. Thus, the portable telephone set posts the call only when receiving the same from the telephone number selected from the stored telephone numbers and authorized to call during music replay, whereby the user can be prevented from an unpleasant disturbance of the music replay caused by a nuisance telephone call or the like.

When receiving the call from a telephone number not authorized by the call set means to call during the music replay by the music replay means, the portable telephone set preferably performs no call processing. Thus, the user can keep on listing to the music with no disturbance by a call from a person not in need of talking.

The portable telephone set according the first aspect preferably further comprises volume control means controlling the volume of the replayed music and the volume of the tone posting said call, so that the volume control means reduces the volume of the replayed music with the elapse of time when superposing the tone posting the call on the replayed music in the process of said music replay. Thus, the call can be more reliably recognized during the music replay due to the aforementioned structure.

In this case, the volume control means preferably gradually reduces the volume of the replayed music with the elapse of time while keeping the volume of the tone posting the call constant.

The portable telephone set according to the first aspect preferably further comprises volume control means controlling the volume of the replayed music and the volume of the tone posting the call, so that the volume control means gradually increases the volume of the tone posting the call with the elapse of time when superposing the tone posting the call on the replayed music in the process of the music replay. Thus, the call can be more reliably recognized during the music replay due to the aforementioned structure.

In this case, the volume control means preferably gradually increases the volume of the tone posting the call with the elapse of time while keeping the volume of the replayed music constant.

When answering to the call, the portable telephone set according to the first aspect may not replay the replayed music while making telephone communication through the talking means.

The portable telephone set according to the first aspect preferably further comprises set means setting a call notice mode, for posting the call at least by vibration when receiving the call during the music replay by the music replay means regardless of the call notice mode set by the set means. Thus, the call can be reliably recognized without disturbing music replay/output regardless of the call notice mode set by the set means.

When the set means sets a notice mode including a sound notice, the portable telephone set according to the first aspect preferably gives no sound notice. In this case, further, the sound notice may include at least a notice through a speaker of the talking means.

The portable telephone set according to the first aspect preferably further comprises set means setting a call notice mode, and is capable of switching a music priority mode for posting the call at least by vibration when receiving the call during the music replay by the music replay means regardless of the call notice mode set by the set means and a set priority mode for posting the call in accordance with the call notice mode set by the set means when receiving the call during the music replay by the music replay means.

In this case, the portable telephone set preferably gives no sound notice in the music priority mode when the set means sets a mode for a sound notice. In this case, further, the sound notice may include at least a notice through a speaker of the talking means.

A portable telephone set according to a second aspect of the present invention comprises talking means and music replay means. When making telephone communication through the talking means during music replay by the music replay means, the portable telephone set superposes a talking voice of the telephone communication on the replayed music in the process of the music replay by the music replay means. Thus, the basic communicative function can be ensured without stopping the music replay due to the aforementioned structure. Consequently, the user of the portable telephone set can be prevented from an unpleasant disturbance of the music replay caused by the telephone communication.

The portable telephone set according to the second aspect preferably further comprises telephone number storage means storing a telephone number, for superposing the talking voice of the telephone communication on the replayed music in the process of the music replay by the music replay means when making the telephone communication with the telephone number stored in the telephone number storage means. Due to this structure, the portable telephone set makes the telephone communication only when receiving the call from the stored telephone number during music replay. Thus, the user of the portable telephone set can be prevented from an unpleasant disturbance of the music replay caused by an erroneous or nuisance telephone call from a third party.

In this case, the volume of the talking voice of the telephone communication and the volume of the replayed music in the process of the music replay are preferably arbitrarily settable. Thus, the volume of the talking voice of the telephone communication and the volume of the replayed music in the process of the music replay can be properly set in response to the situation.

In this case, further, the volume of the talking voice of the telephone communication and the volume of the replayed music in the process of the music replay are preferably arbitrarily settable in correspondence to the telephone number stored in the telephone number storage means.

A portable telephone set according to a third aspect of the present invention comprises talking means and music replay means, for replaying music corresponding to an interruption call from a third party by the music replay means when receiving the interruption call during telephone communication through the talking means and superposing the replayed music on a talking voice of the telephone communication. Thus, the user of the portable telephone set can recognize the interruption call from the third party by desired music when making telephone communication without hitting the telephone communication due to the aforementioned structure.

The portable telephone set according to the third aspect preferably further comprises volume control means controlling the volume of the replayed music and the volume of the talking voice of the telephone communication, so that the volume control means reduces the volume of the talking voice of the telephone communication when superposing the replayed music corresponding to the interruption call on the talking voice of the telephone communication. Thus, the interruption call from the third party can be more reliably recognized due to the aforementioned structure.

The portable telephone set according to the third aspect preferably further comprises volume control means controlling the volume of the replayed music and the volume of the talking voice of the telephone communication, for superposing the replayed music corresponding to the interruption call on the talking voice of the telephone communication while reducing the volume of the replayed music by the volume control means during continuation of a connection state between three persons including talkers and a waiting person when answering to the interruption call from the third party. Thus, the talkers can readily recognize that the third party is in the connection state.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

Figure 1:
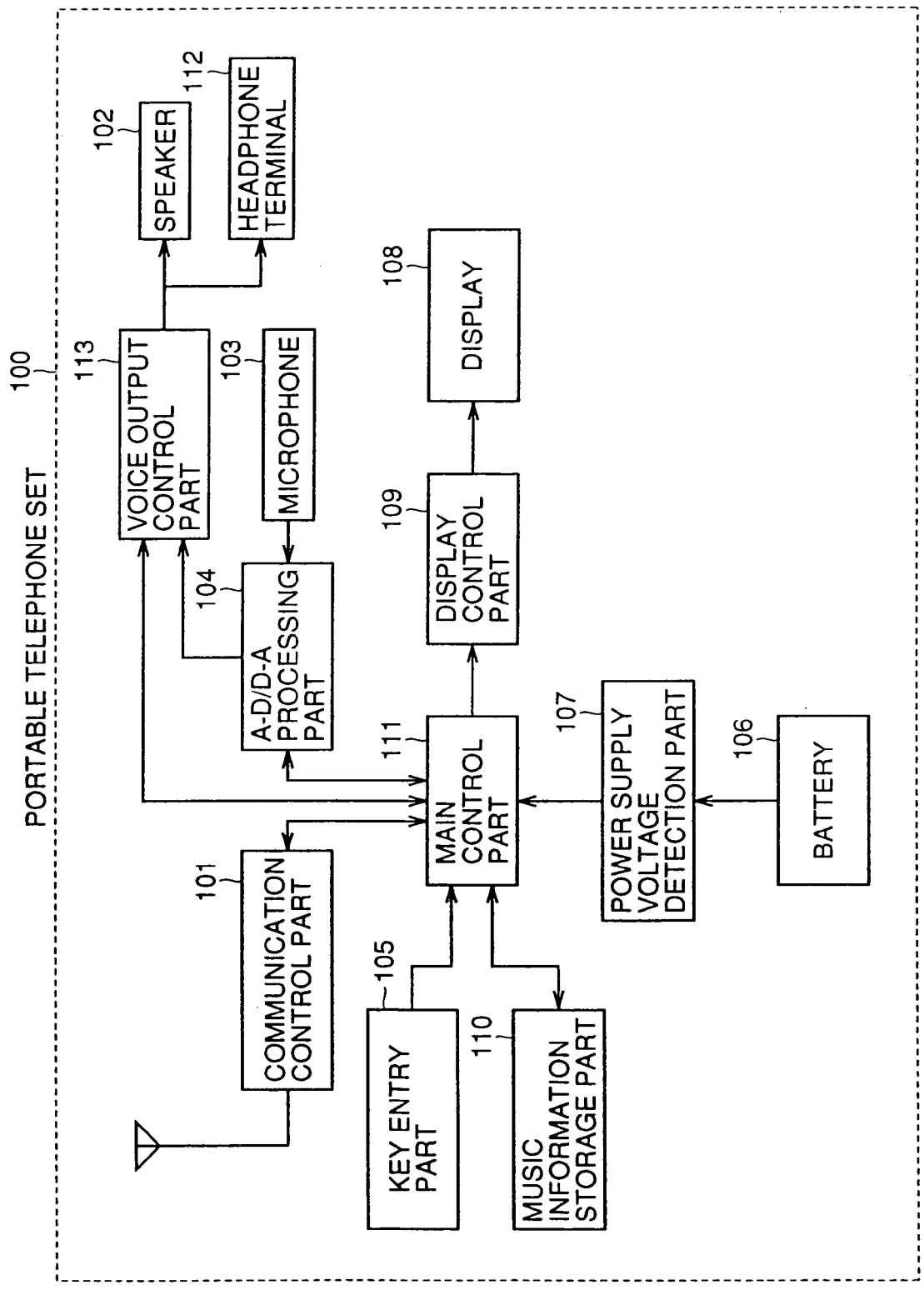
FIG. 1 is a functional block diagram showing a portable telephone set according to each of first and third embodiments of the present invention.

A portable telephone set 100 according to a first embodiment of the present invention is now described with reference to FIGS. 1 and 2. As shown in FIG. 1, the portable telephone set 100 according to the first embodiment comprises a communication control part 101, a speaker 102, a microphone 103, an A-D/D-A processing part 104, a key entry part 105, a battery 106, a power supply voltage detection part 107, a display 108, a display control part 109, a music information storage part 110, a main control part 111, a headphone terminal 112 and a voice output control part 113.

The communication control part 101 has a communication function of a well-known portable telephone, and transmits/receives voice information and data information between the same and a radio communication network through an antenna. The A-D/D-A processing part 104 A-D converts the voice (talking voice) of the user of the portable telephone set 100 received from the microphone 103 and supplies the same to the communication control part 101, while D-A converting voice information from the communication control part 101 and supplying the same to the voice output control part 113.

The key entry part 105 is formed by ten keys or the like used by the user for entering a telephone number or an operator guidance. The battery 106 is formed by a secondary battery. The power supply voltage detection part 107 detects the output voltage of the battery 106. The display control part 109 controls the display 108 formed by an LCD or the like. The music information storage part 110 can store a plurality of music information. The voice output control part 113 mixes the talking voice supplied from the A-D/D-A processing part 104 and replayed music with each other and supplies the same to the speaker 102 or the headphone terminal 112. The main control part 111 controls all components.

The music information storage part 110, which is formed by an external storage medium such as a magnetic disk, a smart medium or a multimedia card (MMC), previously stores a plurality of music information by desired compression processing.

Figure 2:
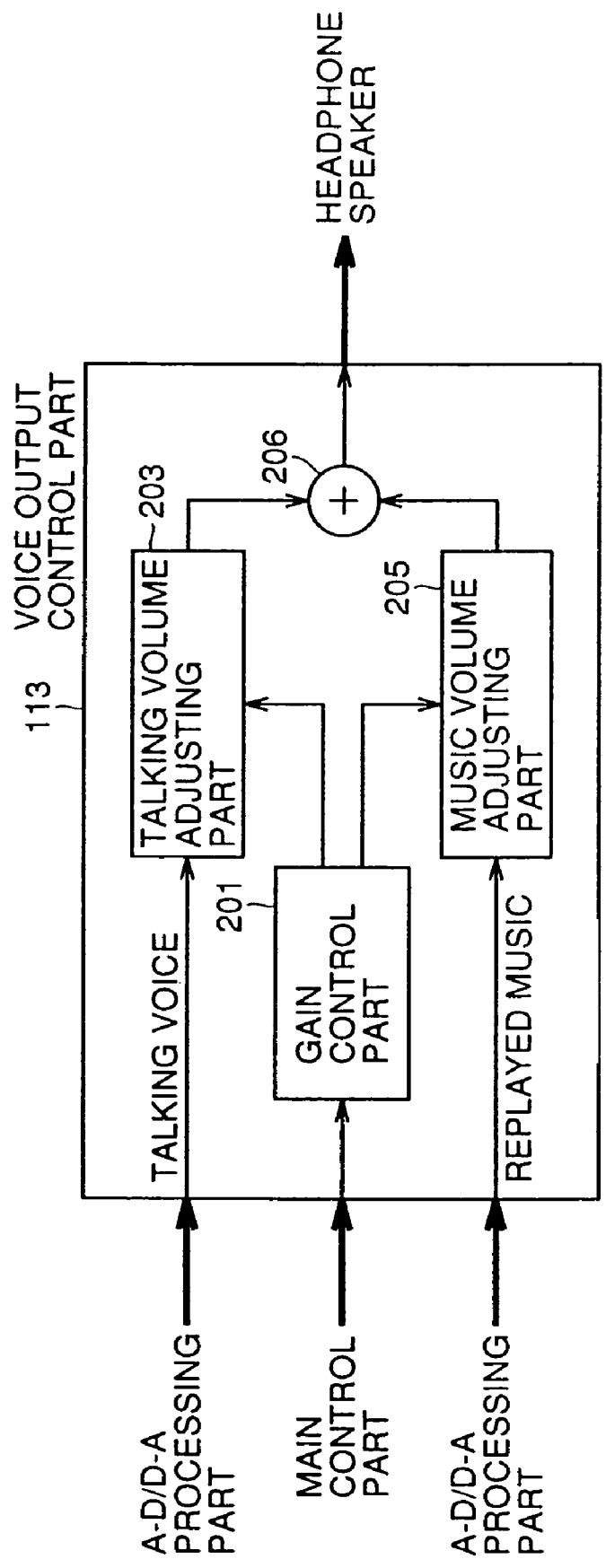
FIG. 2 is a functional block diagram showing a voice output control part of the portable telephone set according to each of first to third embodiments of the present invention.

Referring to FIG. 2, the talking voice supplied from the A-D/D-A processing part 104 is supplied to a talking volume adjusting part 203. The replayed music supplied from the A-D/D-A processing part 104 is supplied to a music volume adjusting part 205. A gain control part 201 controls the talking volume adjusting part 203 and the music volume adjusting part 205 to adjust the talking voice and the replayed music to proper volumes in accordance with an instruction from the main control part 111. The gain control part 201 corresponds to the "volume control means" of the present invention. The talking voice and the replayed music output from the talking volume adjusting part 203 and the music volume adjusting part 205 are mixed with each other by a mixer 206 and supplied to the speaker 102 or the headphone terminal 112.

Operations of a general communicative function in the portable telephone set 100 according to the first embodiment are now briefly described.

Referring to FIG. 1, the user of the portable telephone set 100 first enters a desired destination telephone number through the key entry part 105. Thus, the main control part 111 instructs the communication control part 101 to connect with the entered telephone number. Thus, the communication control part 101 connects with a radio public telephone network by well-known radio communication through portable telephones. The radio communication through portable telephones is performed by a well-known technique and hence redundant description is not repeated.

When making telephone communication, the voice of the user is input from the microphone 103, A-D converted by the A-D/D-A processing part 104 and supplied to the main control part 111. The main control part 111 encodes the digitized voice data by a prescribed voice compression coding system and supplies the same to the communication control part 101. Then communication control part 101 performs well-known communication modulation on the encoded voice data and transmits the same to the radio public telephone network.

Then the communication control part 101 receives the voice of the other party from the radio public telephone network, performs well-known communication demodulation and supplies the voice to the main control part 111. The main control part 111 decodes the received voice information to voice data on the basis of the prescribed voice compression coding system and supplies the voice data to the A-D/D-A processing part 104. The A-D/D-A processing part 104 D-A converts the voice data and supplies the converted voice data to the talking volume adjusting part 203 provided in the voice output control part 113 shown in FIG. 2. The voice data is supplied to the speaker 102 or the headphone terminal 112 through the mixer 206.

In this case, the portable telephone set 100 outputs only the talking voice and hence the gain control part 201 outputs an instruction for mute processing to the music volume adjusting part 205 to stop outputting the replayed music.

Operations of a music replay function in the portable telephone set 100 according to the first embodiment are now described.

Referring to FIG. 1, the main control part 111 reads a list of the titles of pieces of music stored in the music information storage part 110 and displays the same on the display 108 through the display control part 109.

The user selects the title of a desired piece to be replayed from the list of the titles displayed on the display 108 and enters an instruction for replaying the piece by the key entry part 105. The selection of the title and the instruction for replaying the piece are associated with the ten keys or the like forming the key entry part 105 of the portable telephone set 100. Thus, the user can select the title of the piece and instruct replay of the piece by pressing the ten keys corresponding to the selection of the title and the instruction for replay respectively.

The main control part 111 reads desired music information from the music information storage part 110, performs expansion corresponding thereto and thereafter supplies the information to the A-D/D-A processing part 104. The music information is D-A converted by the A-D/D-A processing part 104 and supplied to the voice output control part 113 to be supplied to the music volume adjusting part 205 provided in the voice output control part 113 shown in FIG. 2. The music information is supplied to the speaker 102 or the headphone terminal 112 through the mixer 206.

In this case, the portable telephone set 100 outputs only replayed music and hence the gain control part 201 outputs an instruction for mute processing to the talking volume adjusting part 203 to stop outputting the talking voice.

During the aforementioned operations of the communicative function or the music replay function, the power supply voltage detection part 107 regularly monitors the output voltage of the battery 106 while supplying information corresponding the output voltage of the battery 106 to the main control part 111. On the basis of the information received from the power supply voltage detection part 107, the main control part 111 visually displays the residual of the battery 106 on the display 108 through the display control part 109.

With reference to FIGS. 1 and 2, description is now made on operations performed when receiving a telephone call during the operations of the music replay function in the portable telephone set 100 according to the first embodiment.

An instruction for music replay is similar to the above and hence redundant description is not repeated. In this case, the main control part 111 reads desired music information from the music information storage part 110, performs expansion corresponding thereto and thereafter supplies the same to the A-D/D-A processing part 104. The music information is D-A converted by the A-D/D-A processing part 104 and supplied to the music volume adjusting part 205 provided in the voice output control part 113. The music information is supplied to the speaker 102 or the headphone terminal 112 through the mixer 206. In this case, the portable telephone set 100 outputs only replayed music and hence the gain control part 201 outputs an instruction for mute processing to the talking volume adjusting part 203 to stop outputting the talking voice.

When a call is received from the radio communication network in this state, a call signal is supplied to the main control part 111 through the communication control part 101.

In order to post the call to the user, the main control part 111 outputs a message indicating the call to the display 108 through the display control part 109. At the same time, the main control part 111 outputs a ring tone such as a beep or a calling tone for posting the call in a prescribed volume from the speaker 102 or the headphone terminal 112 through the voice output control part 113. In this case, the ring tone is supplied to the talking volume adjusting part 203 provided in the voice output control part 113 through the A-D/D-A processing part 104.

The gain control part 201 issues an instruction for music volume adjustment to the music volume adjusting part 205 to output the replayed music in a low volume of a prescribed level. The mixer 206 mixes the replayed music adjusted to the low volume and the ring tone with each other and supplies the same to the speaker 102 or the headphone terminal 112. Thus, the user can reliably recognize the call also when listening to the music stored in the music information storage part 110.

While the portable telephone set 100 according to the first embodiment lowers the volume of the replayed music when mixing the replayed music with the ring tone, the replayed music may alternatively be mixed with the ring tone with no change of the volume.

When lowering the volume of the replayed music mixed with the ring tone, mute processing may be so performed as to gradually lower the volume of the replayed music with the elapse of time. In this mute processing, the gain control part 201 outputs an instruction for music volume adjustment to the music volume adjusting part 205 to gradually lower the volume of the replayed music.

When mixing the replayed music and the ring tone with each other, the volume of the call may be gradually increased with the elapse of time without lowering the volume of the replayed music. In this processing, the gain control part 201 outputs an instruction to the talking volume adjusting part 203 to gradually increase the volume of the call with the elapse of time.

When the user answers to the call by manipulating the key entry part 105 or the like, telephone communication is established. The talking voice of the telephone communication is supplied to the mixer 206 through the A-D/D-A processing part 104 and the talking volume adjusting part 203 provided in the voice output control part 113. On the other hand, the replayed music adjusted to a prescribed volume through the A-D/D-A processing part 104 and the music volume adjusting part 205 provided in the voice output control part 113 is supplied to the mixer 206. The mixer 206 mixes the replayed music adjusted to a low volume and the talking voice of the telephone communication with each other and supplies the same to the speaker 102 or the headphone terminal 112. Thus, the user can make telephone communication also when listening to the music stored in the music information storage part 110.

While the portable telephone set 100 according to the first embodiment lowers the volume of the replayed music and outputs the same in superposition with the talking voice when the user answers to the call, the gain control part 201 may output an instruction for mute processing to the music volume adjusting part 205 to stop outputting the replayed music, in order not to output the music during telephone communication. Further, the overall music replay processing may be stopped.

When the user does not answer to the call, the gain control part 201 stops outputting the instruction for music volume adjustment to the music volume adjusting part 205 so that the replayed music is supplied to the speaker 102 or the headphone terminal 112 in a general volume through the mixer 206.

Second Embodiment

A portable telephone set according to a second embodiment of the present invention is now described with reference to FIGS. 2 and 3. In the second embodiment, it is assumed that telephone numbers previously authorized to call are registered in a telephone number storage part (memory) 114 shown in FIG. 3 managed by a main control part 111. This telephone number storage part (memory) 114 corresponds to the "telephone number storage means" of the present invention. Description is now made on a case of receiving a telephone call during operations of a music replay function in the portable telephone set according to the second embodiment.

An instruction for music replay is similar to the above and hence redundant description is not repeated. The main control part 111 reads desired music information from a music information storage part 110, performs expansion corresponding thereto and thereafter supplies the same to an A-D/D-A processing part 104. The music information is D-A converted by the A-D/D-A processing part 104 and supplied to a music volume adjusting part 205 provided in a voice output control part 113 shown in FIG. 2. The music information is supplied to a speaker 102 or a headphone terminal 112 through a mixer 206. At this time, the portable telephone set outputs only replayed music and hence a gain control part 201 outputs an instruction for mute processing to a talking volume adjusting part 203 to stop outputting a talking voice.

When receiving a call from a radio communication network in this state, a call signal is supplied to the main control part 111 through a communication control part 101.

The main control part 111 determines whether or not the call is received from a telephone number authorized to call stored in the telephone number storage part (memory) 114. When the call is received from a telephone number authorized to call stored in the telephone number storage part (memory) 114, the main control part 111 outputs a message indicating the call to a display 108 through a display control part 109 in order to post the call to the user of the portable telephone set, similarly to the aforementioned case. At the same time, the main control part 111 outputs a ring tone such as a beep or a calling tone for posting the call in a prescribed volume from the speaker 102 or the headphone terminal 112 through the voice output control part 113.

In this case, the ring tone is supplied to the talking volume adjusting part 203 provided in the voice output control part 113 through the A-D/D-A processing part 104. The gain control part 201 issues an instruction for outputting the replayed music in a low volume of a prescribed level to the music volume adjusting part 205. The mixer 206 mixes the replayed music adjusted to the low volume and the ring tone with each other and supplies the same to the speaker 102 or the headphone terminal 112. Thus, the user can reliably recognize the call from a party authorized to call also when listening to the music stored in the music information storage part 110.

While the portable telephone set according to the second embodiment lowers the volume of the replayed music when mixing the same with the ring tone, the replayed music may alternatively be mixed with the ring tone with no change of the volume. When lowering the volume of the replayed music mixed with the ring tone, mute processing may be so performed as to gradually lower the volume of the replayed music with the elapse of time. In this mute processing, the gain control part 201 outputs an instruction for music volume adjustment to the music volume adjusting part 205 to gradually lower the volume of the reproduced music.

When mixing the replayed music and the ring tone with each other, the volume of the call may be gradually increased with the elapse of time without lowering the volume of the replayed music. In this processing, the gain control part 201 outputs an instruction to the talking volume adjusting part 203 to gradually increase the volume of the call with the elapse of time.

While the portable telephone set according to the second embodiment authorizes the telephone numbers stored in the telephone number storage part (memory) 114 to call, those authorized to call may be selected from the telephone numbers stored in the memory for authorizing only calls from the selected telephone numbers. In this case, the user reads a list of telephone numbers stored in the telephone number storage part (memory) 114, displays the same on the display 108 through the display control part 109 and selects those authorized to call from the telephone numbers displayed on the display 108 by manipulating a key entry part 105. The key entry part 105 corresponds to the "call set means" of the present invention.

When the user answers to the call by manipulating the key entry part 105 or the like, telephone communication is established. The talking voice of the telephone communication is supplied to the mixer 206 through the A-D/D-A processing part 104 and the talking volume adjusting part 203 provided in the voice output control part 113.

On the other hand, the replayed music adjusted to a prescribed volume through the A-D/D-A processing part 104 and the music volume adjusting part 205 provided in the voice output control part 113 is supplied to the mixer 206. The mixer 206 mixes the replayed music of the low volume and the talking voice of the telephone communication with each other and supplies the same to the speaker 102 or the headphone terminal 112. Thus, the user can make telephone communication also when listening to the music stored in the music information storage part 110.

While the portable telephone set according to the second embodiment lowers the volume of the replayed music and outputs the same in superposition with the talking voice when the user answers to the call, the gain control part 201 may alternatively output an instruction for mute processing to the music volume adjusting part 205 to stop outputting the replayed music, in order not to output the music during telephone communication. Further, the overall music replay processing may be stopped.

When the user does not answer to the call, the gain control part 201 stops outputting the instruction for music volume adjustment to the music volume adjusting part 205 so that the replayed music is supplied to the speaker 102 or the headphone terminal 112 in a general volume through the mixer 206.

When receiving a call from a telephone number not stored (not authorized to call) in the telephone number storage part (memory) 114 managed by the main control part 111, the portable telephone set does not answer to the call but supplies the replayed music to the speaker 102 or the headphone terminal 112 in the general volume through the mixer 206. In other words, the portable telephone set ignores the call from the telephone number not authorized to call. More specifically, the portable telephone set keeps on replaying the music without posting the call to the user by the display on the display 108 and the ring tone (a beep or a calling tone) through the speaker 102 or the headphone terminal 112 (without superposing the replayed music with the ring tone). Thus, the user can keep on listening to the music with no disturbance by a call from a person not in need of talking.

While the portable telephone set according to the second embodiment adjusts the volume of the replayed music to a prescribed level when mixing the talking voice and the replayed music with each other, the user may adjust the talking voice and the replayed music to arbitrary volumes. In the second embodiment, further, the user may adjust the talking voice and the replayed music to arbitrary volumes in correspondence to each of the telephone numbers authorized to call stored in the telephone number storage part (memory) 114.

Third Embodiment

With reference to FIGS. 1 and 2, description is now made on a case of receiving an interruption call from a third party during telephone communication in a portable telephone set according to a third embodiment of the present invention. It is assumed that the portable telephone set according to the third embodiment is set in a state capable of receiving an interruption call from a third party provided by a common carrier. The portable telephone set according to the third embodiment is similar in structure to the portable telephone set 100 according to the first embodiment shown in FIGS. 1 and 2.

At present, the common carrier provides service of hitting telephone communication when receiving an interruption call and outputting a short calling tone for posting the interruption call to the user of the portable telephone set. In this case, the user is displeased by the hit of the telephone communication and the calling tone offensive to the ear.

When the portable telephone set is in the state of telephone communication, the talking voice of the party is supplied to an A-D/D-A processing part 104 through a communication control part 101 and a main control part 111. The talking voice of the party is supplied to a mixer 206 through the A-D/D-A processing part 104 and a talking volume adjusting part 203 provided in a voice output control part 113. At this time, the portable telephone set outputs only the talking voice and hence a gain control part 201 outputs an instruction for mute processing to a music volume adjusting part 205 to stop outputting replayed music.

When receiving an interruption call from a third party in the state of telephone communication, an interruption call signal is supplied to the main control part 111 through the communication control part 101.

In order to post the interruption call from the third party to the user, the main control part 111 outputs a message indicating the interruption call to a display 108 through a display control part 109. At the same time, the main control part 111 outputs a desired piece of music stored in a music information storage part 110 as an interruption call tone posting the interruption call from the third party in a prescribed volume from a speaker 102 or a headphone terminal 112 through the voice output control part 113 during continuation of the interruption call.

In this case, the interruption call tone of the piece of music is supplied to a music volume adjusting part 205 provided in the voice output control part 113 through the A-D/D-A processing part 104. The gain control part 201 issues an instruction for outputting the talking voice in a low volume to the talking volume adjusting part 203 so that the volume of the talking voice reaches a prescribed level. A mixer 206 mixes the talking voice adjusted to the low volume and the interruption call tone with each other and supplies the same to the speaker 102 or the headphone terminal 112. Thus, the user can recognize the interruption call from the third party through the desired piece of music with neither hit of telephone communication nor calling tone offensive to the ear.

As to the interruption call tone, the user previously reads a list of titles of pieces of music stored in the music information storage part 110 and displays the same on the display 108 through the display control part 109 for selecting the title of a desired piece from the list displayed on the display 108 by manipulating a key entry part 105. While the portable telephone set according to the third embodiment lowers the volume of the talking voice when mixing the talking voice with the interruption call tone of music, the talking voice may alternatively be mixed with the interruption call tone of music with no change of the volume.

When the user answers to the interruption call from the third party by manipulating the key entry part 105 or the like, telephone communication with the third party is established and the gain control part 201 outputs an instruction for mute processing to the music volume adjusting part 205 to stop outputting the interruption call tone of music so that the main control part 111 does not output the interruption call tone of music.

When the user answers to the interruption call from the third party, the portable telephone set temporarily makes telephone communication between two persons, i.e., the user and the interrupter (third party). In this case, however, the portable telephone set is substantially in a connection state between three persons since the party of the previous telephone communication stands by. The interruption call tone of music may be adjusted to a low volume and superposed with the talking voice during continuation of the connection state between the three persons. Thus, the user can readily recognize the connection state between the three persons.

When the user does not answer to the interruption call from the third party, the gain control part 201 stops outputting the instruction for adjusting the volume of the talking voice to the talking volume adjusting part 203 so that the talking voice is supplied to the speaker 102 or the headphone terminal 112 in a general volume through the mixer 206.

Figure 3:
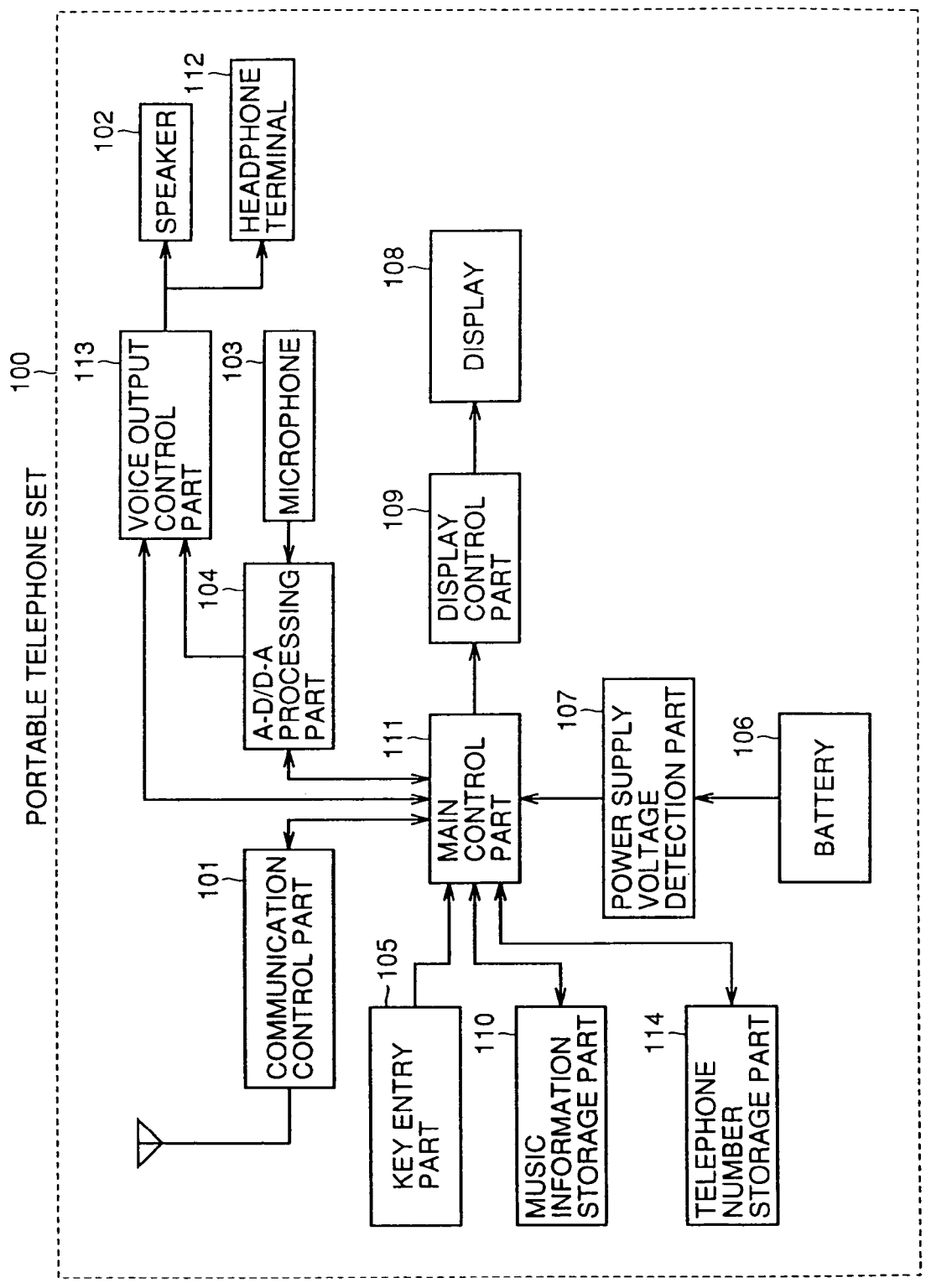
FIG. 3 is a functional block diagram showing the portable telephone set according to the second embodiment of the present invention.

While the voice output control part 113 is provided between the A-D/D-A processing part 104 and the speaker 102 and the headphone terminal 112 for performing analog processing in each the aforementioned first to third embodiments as shown in FIGS. 1 and 3, the voice output control part 113 can alternatively be provided between the A-D/D-A processing part 104 and the main control part 111 for performing digital processing, as a matter of course.

Fourth Embodiment

Figure 4:
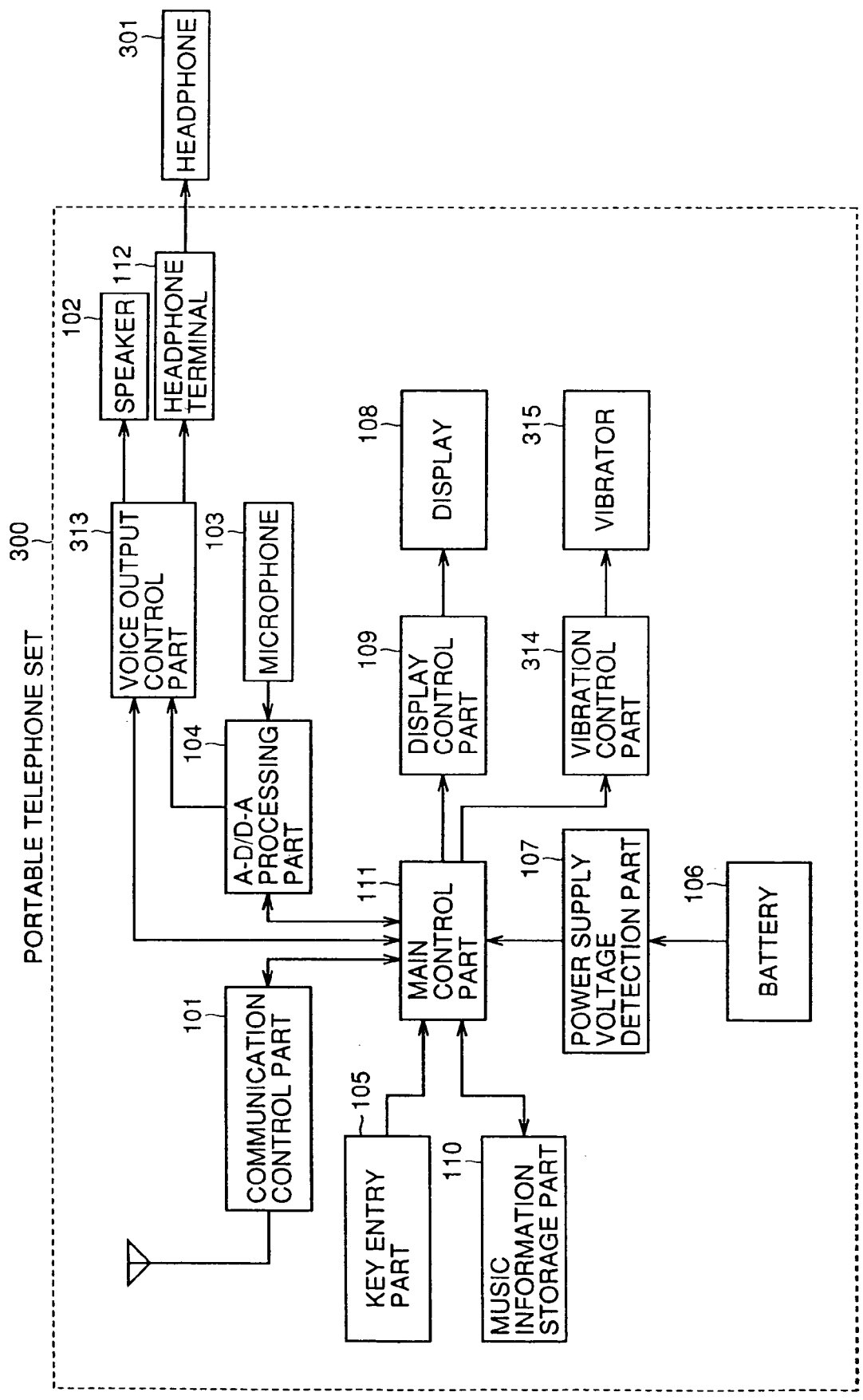
FIG. 4 is a functional block diagram showing a portable telephone set according to a fourth embodiment of the present invention.

A portable telephone set 300 according to a fourth embodiment of the present invention is now described with reference to FIGS. 4 and 5. As shown in FIG. 4, the portable telephone set 300 according to the fourth embodiment comprises a communication control part 101, a speaker 102, a microphone 103, an A-D/D-A processing part 104, a key entry part 105, a battery 106, a power supply voltage detection part 107, a display 108, a display control part 109, a music information storage part 110, a main control part 111, a headphone terminal 112 and a voice output control part 313, similarly to the portable telephone set 100 according to the first embodiment shown in FIG. 1. The communication control part 101, the speaker 102, the microphone 103, the A-D/D-A processing part 104, the key entry part 105, the battery 106, the power supply voltage detection part 107, the display 108, the display control part 109, the music information storage part 110, the main control part 111 and the headphone terminal 112 are similar in structure and function to those of the first embodiment.

The portable telephone set 300 according to the fourth embodiment further comprises a vibration control part 314 and a vibrator 315, dissimilarly to the first embodiment. The vibration control part 314 controls vibration of the vibrator 315 formed by a motor having an eccentric weight or the like on the axis of rotation. A headphone 301 is attachable to the headphone terminal 112.

Figure 5:
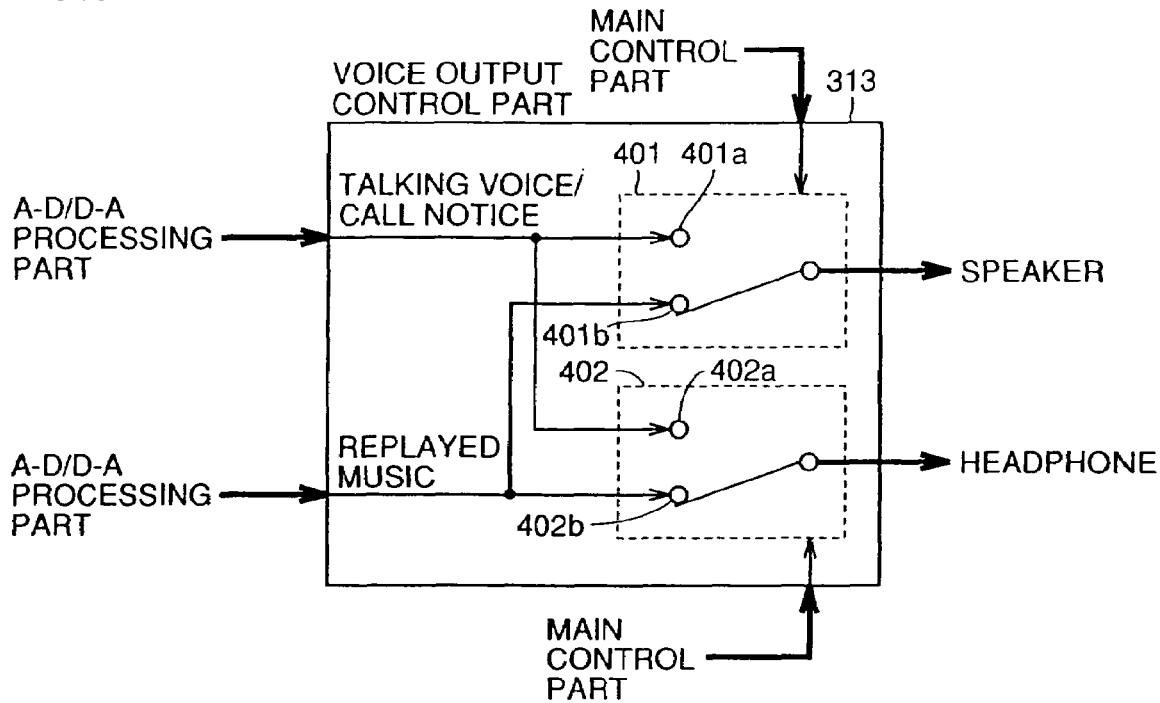
FIG. 5 is a functional block diagram showing a voice output control part of the portable telephone set according to the fourth embodiment of the present invention.

Referring to FIG. 5, a talking voice supplied from the A-D/D-A processing part 104 is supplied to an input/output terminal 401a of a speaker output switching part 401 and an input/output terminal 402a of a headphone output switching part 402. Replayed music supplied from the A-D/D-A processing part 104 is supplied to another input/output terminal 401b of the speaker output switching part 401 and another input/output terminal 402b of the headphone output switching part 402.

In response to an instruction from the main control part 111, the speaker output switching part 401 switches the input/output terminal 401a or 401b to be connected to an output terminal. In response to an instruction from the main control part 111, the headphone output switching part 402 switches the input/output terminal 402a or 402b to be connected to an output terminal.

Thus, the talking voice and the replayed music can be supplied to either the speaker 102 or the headphone terminal 112 in response to the switching positions of the speaker output switching part 401 and the headphone output switching part 402. The user of the portable telephone set 300 sets whether to output the talking voice and the replayed music from the speaker 102 or from the headphone terminal 112 by manipulating the key entry part 105.

Operations of a general communicative function in the portable telephone set 300 according to the fourth embodiment are now briefly described.

Referring to FIG. 4, the user first enters a desired destination telephone number from the key entry part 105. Thus, the main control part 111 instructs the communication control part 101 to connect with the entered telephone number. Thus, the communication control part 101 connects with a radio public telephone network through well-known radio communication processing through portable telephones. The radio communication processing through portable telephones is made by a well-known technique and hence redundant description is not repeated.

In telephone communication, the voice of the user of the portable telephone set 300 is input from the microphone 103, A-D converted by the A-D/D-A processing part 104 and supplied to the main control part 111. The main control part 111 encodes the digitized voice data by a prescribed voice compression coding system and supplies the same to the communication control part 101. The communication control part 101 performs well-known communication modulation and transmits the voice data to a the radio public telephone network.

The communication control part 101 receives the voice of the party from the radio public telephone network, performs well-known communication demodulation and supplies the same to the main control part 111. The main control part 111 decodes the received voice information to voice data on the basis of the prescribed voice compression coding system and supplies the voice data to the A-D/D-A processing part 104. The voice data is D-A converted by the A-D/D-A processing part 104 and supplied to the input/output terminals 401a and 402a of the speaker output switching part 401 and the headphone output switching part 402 provided in the voice output control part 313 shown in FIG. 5.

If the user previously manipulates the key entry part 105 and instructs the main control part 111 to output the talking voice from the speaker 102, the speaker output switching part 401 is connected to the input/output terminal 401*a*. If the user previously manipulates the key entry part 105 and instructs the main control part 111 to output the talking voice from the headphone 301, the headphone output switching part 402 is connected to the input/output terminal 402*a*.

Operations of a music replay function in the portable telephone set 300 according to the fourth embodiment are now described.

Referring to FIG. 4, the main control part 111 reads a list of the titles of pieces of music stored in the music information storage part 110 and displays the same on the display 108 through the display control part 109.

The user selects the title of a desired piece to be replayed from the list displayed on the display 108 and enters an instruction for replaying the piece through the key entry part 105. The selection of the title and the instruction for replaying the piece are associated with ten keys etc. forming the key entry part 105 of the portable telephone set 300. Thus, the user can select the title of the piece and instruct replay of the piece by pressing the ten keys corresponding to the selection of the title and the instruction for replay respectively.

The main control part 111 reads desired music information from the music information storage part 110, performs expansion corresponding thereto and thereafter supplies the same to the A-D/D-A processing part 104. The music information is D-A converted by the A-D/D-A processing part 104 and supplied to the voice output control part 113 to be further supplied to the input/output terminals 401*b* and 402*b* of the speaker output switching part 313 and the headphone output switching part 402 provided in the voice output control part 313 shown in FIG. 5. The music information is supplied to the speaker 102 or to the headphone 301 through the headphone terminal 112 in accordance with an instruction from the main control part 111.

If the user previously manipulates the key entry part 105 and instructs the main control part 111 to replay music through the speaker 102, the speaker output switching part 401 is connected to the input/output terminal 401*b*. If the user previously manipulates the key entry part 105 and instructs the main control part 111 to replay music through the headphone 301, the headphone output switching part 402 is connected to the input/output terminal 402*b*.

During the aforementioned operations of the communicative function or the music replay function, the power supply voltage detection part 107 regularly monitors the output voltage of the battery 106 while supplying information corresponding the output voltage of the battery 106 to the main control part 111. On the basis of the information received from the power supply voltage detection part 107, the main control part 111 visually displays the residual of the battery 106 on the display 108 through the display control part 109.

With reference to FIGS. 4 and 5, description is now made on operations in a music priority mode and a set priority mode in a case of receiving a telephone call during the operations of the music replay function in the portable telephone set 300 according to the fourth embodiment.

The call is posted to the user by a sound notice through the speaker 102 or the headphone 301, a vibration notice through the vibrator 315 or a sound/vibration notice through combination of the speaker 102 and the headphone 301. The user sets the mode for the call notice by manipulating the key entry part 105.

*An instruction for music replay is similar to the above and hence redundant description is not repeated. In this case, the main control part 111 reads desired music information from the music information storage part 110, performs expansion corresponding thereto and thereafter supplies the same to the A-D/D-A processing part 104. The music information is D-A converted by the A-D/D-A processing part 104 and supplied to the input/output terminals 401*b* and 402*b* of the speaker output switching part 401 and the headphone output switching part 402 provided in the voice output control part 313.

If the user previously manipulates the key entry part 105 and instructs the main control part 111 to replay music through the speaker 102, the speaker output switching part 401 is connected to the input/output terminal 401*b*. If the user previously manipulates the key entry part 105 and instructs the main control part 111 to replay music through the headphone 301, the headphone output switching part 402 is connected to the input/output terminal 402*b*. Thus, the replayed music is supplied to the headphone 301 through the headphone terminal 112 or to the speaker 102.

At this time, the portable telephone set 300 outputs only the replayed music and hence the main control part 111 stops outputting the talking voice to the A-D/D-A processing part 104.

When receiving a call from the radio communication network in this state, a call signal is supplied to the main control part 111 through the communication control part 101.

If the set priority mode is selected, the main control part 111 makes control to post the call to the user in accordance with this mode. In other words, the main control part 111 posts the call to the user in a mode similar to that in the case of performing no music replay.

If a sound notice through the speaker 102 is selected as the call notice mode, therefore, the main control part 111 supplies sound information for posting the call to the voice output control part 313 through the A-D/D-A processing part 104 similarly to the talking voice. The speaker 102 stops outputting the replayed music and posts the call to the user. If the headphone 301 outputs the replayed music, the speaker 102 posts the call by the sound notice while allowing the headphone 301 to continue the output.

If the music priority mode is selected, on the other hand, the main control part 111 outputs a drive signal to the vibration control part 314 for vibrating the vibrator 315 in order to post the call to the user regardless of the set notice mode. At the same time, the main control part 111 outputs a message indicating the call to the display 108 through the display control part 109.

Thus, in the music priority mode, the user can reliably recognize the call also when listening to the music stored in the music information storage part 110 with no disturbance of the music replay.

Also when the user sets the sound notice through the key entry part 105, the portable telephone set 300 outputs no sound notice and the user can be prevented from displeasing those around him by missing the sound notice output from the speaker 102 during the music replay by the headphone 301.

The user sets either the music priority mode or the set priority mode by manipulating the key entry part 105. Thus, the user can freely set the mode for posting the call during music replay in response to his preference. Consequently, the handleability of the portable telephone set 300 is improved.

Figure 6:
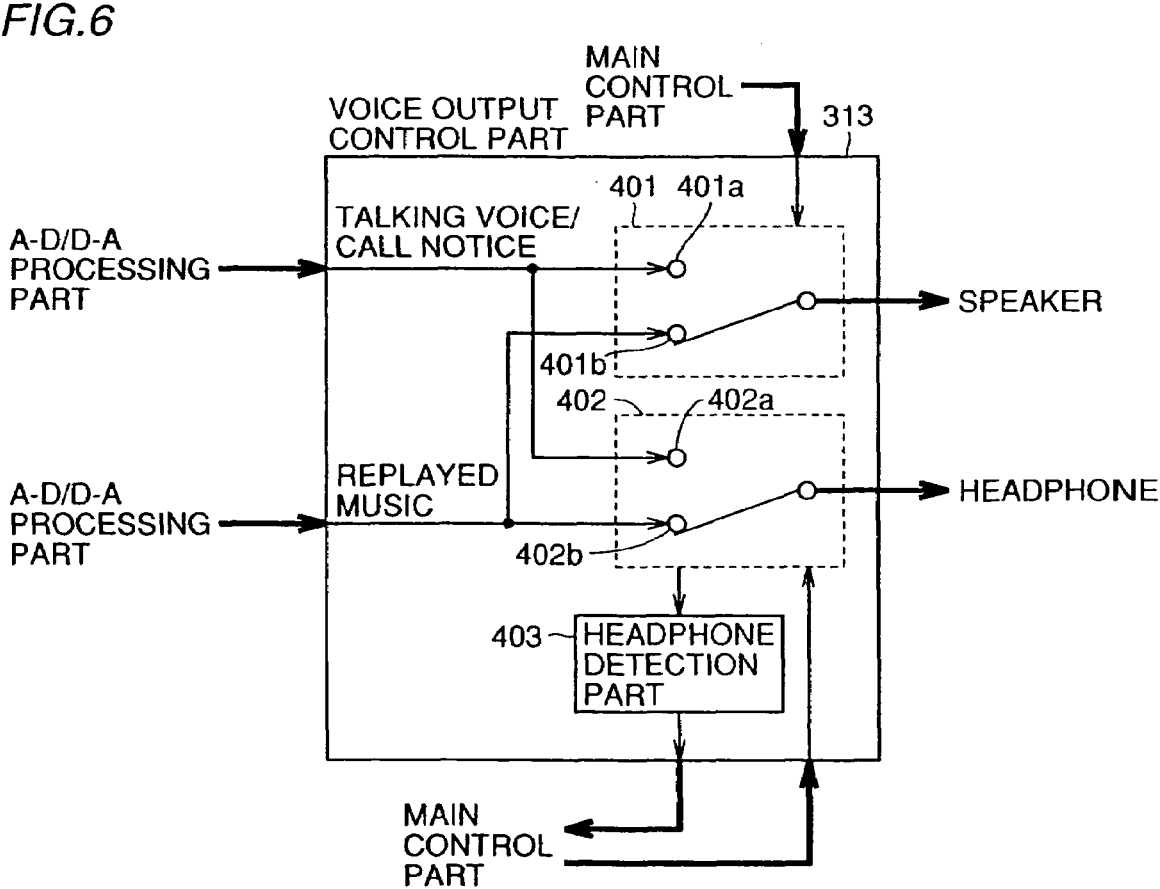
FIG. 6 is a functional block diagram showing a voice output control part of a portable telephone set according to a modification of the fourth embodiment of the present invention.

While the user manipulates the key entry part 105 for setting whether to output the replayed music from the speaker 102 or from the headphone 301 in the fourth embodiment, a modification of the fourth embodiment shown in FIG. 6 may alternatively be employed.

In the modification of the fourth embodiment shown in FIG. 6, a headphone detection part 403 detecting attachment of the headphone 301 to the headphone terminal 112 is provided in the voice output control part 313. Whether to output the replayed music and the talking voice from the speaker 102 or from the headphone 301 may be automatically set on the basis of the result of detection by the headphone detection part 403.

When the headphone 301 is attached to the headphone terminal 112, the headphone detection part 403 detects this attachment and inputs corresponding information in the main control part 111. In response to this information, the main control part 111 makes control to output the replayed music and the talking voice from the headphone 301. Thus, the output mode for the replayed music and the talking voice is automatically decided with no manipulation of the key entry part 105. Thus, the portable telephone set according to the modification of the fourth embodiment is easier to handle.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable telephone set comprising:

talking portion;

music replay portion, for superposing a talking voice of telephone communication on replayed music in the process of music replay by said music replay portion when making said telephone communication through said talking portion during said music replay by said music replay portion; and volume control portion for controlling the volume of said replayed music and the volume of said talking voice of the telephone communication; and said volume control portion includes a talking volume adjusting part, a music volume adjusting part and a single control part controlling, mutually independently, said talking volume adjusting part and said music volume adjusting part.

2. The portable telephone set according to claim 1, further comprising:

telephone number storage portion storing a telephone number, for superposing said talking voice of said telephone communication on said replayed music in the process of said music replay by said music replay portion when making said telephone communication with said telephone number stored in said telephone number storage portion.

3. The portable telephone set according to claim 1, capable of arbitrarily setting the volume of said talking voice of said telephone communication and the volume of said replayed music in the process of said music replay.

4. The portable telephone set according to claim 2, capable of arbitrarily setting the volume of said talking voice of said telephone communication and the volume of said replayed music in the process of said music replay in correspondence to said telephone number stored in said telephone number storage portion.

5. The portable telephone set according to claim 1, wherein said volume control portion reduces the volume of said replayed music when superposing the talking voice of the telephone communication on the replayed music in the process of music replay.

* * * * *